(12) United States Patent
Haimer (10) Patent No.: US 10,730,118 B2
(45) Date of Patent: Aug. 4, 2020

(54) ROTATABLE CUTTING TOOL AND KEY THEREFOR

(71) Applicant: Franz Haimer Maschinenbau KG, Igenhausen (DE)

(72) Inventor: Franz Haimer, Igenhausen (DE)

(73) Assignee: Franz Haimer Maschinenbau KG, Igenhausen (DE)

( * ) Notice: Subject to any disclaimer, the term of this patent is extended or adjusted under 35 U.S.C. 154(b) by 505 days.

(21) Appl. No.: 15/222,495

(22) Filed: Jul. 28, 2016

(65) Prior Publication Data

US 2017/0028479 A1 Feb. 2, 2017

(30) Foreign Application Priority Data

Jul. 29, 2015 (DE) ........................ 10 2015 214 434

(51) Int. Cl.
*B23C 5/10* (2006.01)
*B23B 51/00* (2006.01)
(Continued)

(52) U.S. Cl.
CPC .......... *B23B 51/00* (2013.01); *B23B 31/1115* (2013.01); *B23C 5/10* (2013.01);
(Continued)

(58) Field of Classification Search
CPC ............. B23B 31/11; B23B 2231/2081; B23B 2231/0204; B23B 2260/078; B25B 13/00;
(Continued)

(56) References Cited

U.S. PATENT DOCUMENTS

| 1,615,233 A | * | 1/1927 | Redinger | ................ B23B 31/11 |
| | | | | 279/42 |
| 1,867,372 A | * | 7/1932 | McGuckin | .............. B25B 13/48 |
| | | | | 7/100 |

(Continued)

FOREIGN PATENT DOCUMENTS

| CH | 700315 A2 | * | 7/2010 | ........... B23B 31/201 |
| DE | 231 581 C | | 3/1909 | |

(Continued)

OTHER PUBLICATIONS

Description CH700315 (translation) obtained at https://worldwide.espacenet.com/ (last visited Oct. 17, 2019).*

(Continued)

*Primary Examiner* — Ryan C Rufo (57) ABSTRACT

A rotatable cutting tool, which extends along a tool axis defining an axial direction, includes a cutting formation in a first axial longitudinal end region, which is configured for material ablation on a workpiece, and includes a screw-connection formation in a second axial longitudinal end region opposing the first, which is configured for screw connection with a coupling unit. The cutting tool includes key-contact surface formations diametrically opposing each other with respect to the tool axis, which are configured for torque-transmitting abutting engagement with key surfaces of a key. Each of the key-contact-surface formations includes at least two key-contact surface regions provided with spacing from each other in the circumferential direction about the tool axis, which key-contact surface regions are inclined away from each other such that they form a vertex projecting away from the tool axis.

17 Claims, 4 Drawing Sheets

(51) Int. Cl.
*B23B 31/11* (2006.01)
*B25B 13/08* (2006.01)

(52) U.S. Cl.
CPC ...... *B25B 13/08* (2013.01); *B23B 2231/0204* (2013.01); *B23B 2251/02* (2013.01); *B23B 2260/078* (2013.01); *B23C 2210/02* (2013.01); *B23C 2210/03* (2013.01); *B23C 2240/32* (2013.01)

(58) Field of Classification Search
CPC ... B23C 5/10; B23C 2210/02; B23C 2251/02; B23C 5/20; B23C 2240/32; F16B 7/182
See application file for complete search history.

(56) References Cited

U.S. PATENT DOCUMENTS

| | | | | |
|---|---|---|---|---|
| 2,622,649 | A * | 12/1952 | Hunter | F16B 39/36 411/270 |
| 2,830,480 | A * | 4/1958 | Brame | B25B 13/02 81/176.15 |
| 3,242,775 | A | 3/1966 | Hinkle | |
| 3,747,442 | A * | 7/1973 | Rausch | B25B 13/48 81/53.2 |
| 5,427,468 | A * | 6/1995 | Muellenberg | F16D 1/04 403/350 |
| 5,938,380 | A * | 8/1999 | Saniez | B23B 31/008 279/102 |
| 5,953,968 | A | 9/1999 | Macor | |
| 5,971,670 | A * | 10/1999 | Pantzar | B23B 31/1107 407/119 |
| 6,082,228 | A | 7/2000 | Macor | |
| 6,227,076 | B1 * | 5/2001 | Murray | B25B 13/44 81/58.2 |
| 2002/0021945 | A1 * | 2/2002 | Harpaz | B23B 31/11 407/53 |
| 2004/0016323 | A1 | 1/2004 | Wright et al. | |
| 2004/0247413 | A1 * | 12/2004 | Ha | B25B 13/44 411/402 |
| 2006/0051174 | A1 * | 3/2006 | Pantzar | B23C 5/10 409/234 |
| 2006/0072977 | A1 * | 4/2006 | Jonsson | B23B 31/1107 408/233 |
| 2006/0073744 | A1 * | 4/2006 | Jonsson | B23B 31/11 439/884 |
| 2006/0257215 | A1 * | 11/2006 | Kakai | B23B 31/11 407/101 |
| 2008/0101878 | A1 * | 5/2008 | Skilberg | B23B 31/11 407/54 |
| 2009/0224491 | A1 * | 9/2009 | Thiel | B23B 31/1207 279/62 |
| 2010/0247263 | A1 * | 9/2010 | Azegami | B23B 31/1107 409/234 |
| 2010/0296881 | A1 * | 11/2010 | Huang | B23C 5/10 407/47 |
| 2012/0093602 | A1 * | 4/2012 | Osawa | B23B 31/005 408/239 R |
| 2014/0294528 | A1 * | 10/2014 | Azegami | B23C 5/10 408/200 |
| 2015/0016905 | A1 * | 1/2015 | Haimer | B23B 31/1115 408/57 |
| 2015/0030399 | A1 * | 1/2015 | Frota de Souza | B23C 5/10 407/33 |
| 2015/0217380 | A1 | 8/2015 | Haimer | |
| 2015/0337897 | A1 * | 11/2015 | Griewenka | F16C 23/02 384/255 |
| 2016/0031018 | A1 * | 2/2016 | Ota | B23C 5/10 407/53 |
| 2017/0291230 | A1 * | 10/2017 | Harpaz | B23C 5/10 |
| 2018/0009043 | A1 * | 1/2018 | David | B23C 5/10 |
| 2018/0200804 | A1 * | 7/2018 | Haimer | B23B 31/005 |

FOREIGN PATENT DOCUMENTS

| | | |
|---|---|---|
| EP | 0 425 883 A2 | 5/1991 |
| FR | 2 814 101 A1 | 3/2002 |
| JP | S56-171165 U | 12/1981 |
| WO | 2014/026975 A1 | 2/2014 |

OTHER PUBLICATIONS

Search Report issued for European Patent Application No. 16181456.1 dated Dec. 19, 2016 with machine English translation (16 pages).
Search Report issued for German application No. 10 2015 214 434.8 dated Apr. 26, 2016 with machine English translation (11 pages).

\* cited by examiner

ROTATABLE CUTTING TOOL AND KEY THEREFOR

CROSS REFERENCE TO RELATED APPLICATION(S)

This application claims priority to German Application No. 10 2015 214 434.8, filed Jul. 29, 2015, the entire contents of which is incorporated herein by reference.

BACKGROUND OF THE INVENTION

Field of the Invention

The present application relates to a rotatable cutting tool, in particular a tool head, such as, for example, a milling-, grinding-, or drill-head, which extends along a tool axis defining an axial direction, wherein the cutting tool has a cutting formation in a first axial longitudinal end region, which is configured for material ablation on a workpiece, wherein the cutting tool includes a screw-connection formation in a second axial longitudinal end region opposing the first, which is configured for screw connection to a coupling component, such as, for example, a shaft component, tool receptacle, and/or chuck, and wherein the cutting tool includes key-contact-surface formations diametrically opposing each other with respect to the tool axis, which are configured for torque-transmitting abutting engagement with key surfaces of a key, in particular of a torque key.

The present invention further relates to a spanner formation for a key, in particular a torque key, for the introduction of torque into a rotatable object, in particular into the key-contact-surface formations of a rotatable cutting tool, wherein starting from a jaw opening of the spanner formation the rotatable object is insertable in an insertion direction along an insertion axis into the spanner formation, wherein the spanner formation includes two jaws extending essentially along the insertion axis and opposing away over the insertion axis, wherein each jaw includes exactly two key-surface regions that follow along the insertion axis and that are inclined away from each other such that they form a vertex projecting towards the respective other jaw.

Rotatable cutting tools are generally known. Among persons skilled in the art they are also referred to as "tool heads" or "screw heads."

The idea behind the above-mentioned cutting tools is that with the intended use of a cutting tool, essentially only the machining formation, that is the cutting edges, is abraded, while the other component sections of the cutting tool remain ready for operation, independent of the wear of the cutting formation. For this purpose, cutting tools have been provided wherein the abraded cutting formation can be exchanged for an unabraded one, wherein the at least one remaining component carrying the cutting tool can be further used. Such a component carrying the cutting tool can be a shaft component, wherein the cutting tool can be screwed in with its screw-connection formation. The shaft component can be designed, for example, with a shaft diameter differing from the cutting tool and adapted for tool receptacles. The component carrying the cutting tool can also be a tool receptacle or a chuck itself, into which the cutting tool of the present invention can be directly screwed-in without the intermediate disposing of a shaft component. The cutting tools of the above-described type are used in rotating machine tools, for example, in drilling or milling machines.

Description of the Related Art

A rotatable cutting tool of the above-described type is known, for example, from WO 2014/026975 A1 of the applicant.

These cutting tools of the above-described type are usually screwed into the component carrying the cutting tool using keys, in particular torque keys, specially designed for them. For this purpose, these keys include a spanner formation into which the key-contact-surface formations of the cutting tool are insertable along an insertion axis.

In the prior art both, the key-contact-surface formations on the rotatable cutting tool and the key-surface regions on the spanner formation are formed by exactly two parallel flat abutment surfaces, which in the case of the key-contact-surface formations are oriented and disposed with mirror symmetry to a plane that extends parallel to the abutment surfaces. This also applies in a corresponding manner to the key-surface regions of the spanner formation for which, however, the key axis is only available if the spanner formation is located in abutting engagement with the cutting tool.

This known configuration of tool-side key-contact-surface formations and of key-side key-surface regions as simply parallel flat abutment surfaces with the insertion of the cutting tool into the spanner formation leads—sometimes due to the low tolerances between nominal spanner width and nominal spacing of the key-contact-surface formations—to protracted threading processes requiring patience until torque can finally be transmitted from the spanner formation to the rotatable cutting tool.

It is therefore the object of the present invention to specify a technical teaching that allows cutting tools of the above-described type to be brought into abutting engagement with an associated key without complex insertion- or threading-action, and that further makes it possible that after production of the abutting engagement, the introduction of torque into the cutting tool occurs by means of surface contact between tool-side key-contact surface regions and key-side key-surface regions so that an edge stress in the key-contact surface regions, often observed in the prior art in cutting tools during the introduction of torque, is reduced or even completely avoided.

A spanner for hexagonal screws is known from U.S. Pat. No. 3,242,775 A wherein each jaw includes exactly three key-surface regions, which follow in sequence in the insertion direction. Here the central key-surface regions extend parallel to the insertion axis; the key-surface regions close to the spanner opening and the key-surface regions far from the spanner opening are respectively inclined—but in different directions—by approximately 6.5° with respect to the central key-surface region. The key-surface regions of the two jaws, which key-surface regions are close to the spanner opening and directly opposing each other, extend towards each other in the insertion direction; in contrast, the inclined key-surface regions far from the spanner opening extend away from each other in the insertion direction.

The intention of using this spanner formation is, independently of the dimensions, a specific hexagonal screw head that is to be screwed in and, independently of the dimensions, the specific spanner that is to be used therefor might have within the respective permitted tolerances, to ensure that the torque is actually introduced into the key-contact surface regions of the hexagonal screw head and not into its edges. In practice, the result is that, depending on what the abovementioned dimensions turn out to be within the permitted tolerances, either the central parallel flat key-surface regions or the inclined key-surface regions adjacent thereto introduce torque into a hexagonal screw head, depending on the chosen direction of rotation.

A spanner is known from DE 23 15 81 B wherein each jaw includes exactly two key-surface regions that are inclined relative to each other such that they form a vertex projecting towards the respective other jaw, wherein the key-surface region closest to the spanner opening of the one jaw is parallel to the key-surface region farthest from the spanner opening of the respective other opposing jaw, and vice versa.

The key-surface regions of the jaws of this known spanner have a relatively large angle of inclination with respect to one another, since the goal of the technical teaching underpinning this construction is to be able to turn back the spanner against the direction of rotation of the introduction of torque without thereby having to again loosen the screw having a hexagonal screw head, section by section, in order to remove the spanner from the screw head, against the direction of insertion, and bypass any obstacles.

Since the spanner formation known from DE 23 15 81 B has a dimensioning in its plane of extension orthogonal to the axis of insertion which, overall, is approximately double the thin spanner width in order to be able to provide a sufficient stiffness for an introduction of torque, the key-surface regions of the respective jaws must have a relatively large angle of inclination in order to be able to securely remove the spanner formation with its total dimensions from a hexagonal screw head against the direction of insertion in the event of a corresponding obstacle. However, the presently mentioned publications relating to spanners of the prior art do not refer to a screwing-in or unscrewing of cutting tools from components carrying them, but rather exclusively refer to an interaction with usual hexagonal screw heads. It is to be observed here that hexagonal screw heads, as mass-produced products, and the spanners used for their operation, are subject to substantially more liberal dimensional tolerances than the high-precision cutting tools and their associated keys. With the liberal dimensional tolerances, completely different engagements and force ratios arise with the torque introduction into hexagonal screws than into key-surface-region formations of cutting tools.

SUMMARY OF THE INVENTION

According to a first aspect of the present invention, the above-mentioned object is achieved by a rotatable cutting tool of the above-mentioned type wherein each of the key-contact-surface formations includes at least two key-contact surface regions provided in the circumferential direction about the tool axis with spacing from one another, which key-contact surface regions are inclined away from each other such that they form a vertex protruding away from the tool axis.

The vertex can be an acute vertex if, for example, the key-contact surface regions inclined relative to each other are directly adjacent to each other. However, the vertex can also be flattened, for example, if an intermediate surface region is provided between the key-contact surface regions inclined relative to each other. In the circumferential direction about the tool axis, the flattened vertex is longer than the acute vertex, but in the radial direction, it is less far away from the tool axis, which can facilitate the pushing-on of a key onto the key-contact-surface formation.

Here the tool axis is the axis of rotation about which the cutting tool rotates in cutting a operation according to intended operation and use.

Due to the accordingly inclined formation of key-contact surface regions in the two key-contact-surface formations, when viewed radially outward in the circumferential direction, the key-contact-surface formations are convex about the tool axis—as a rule preferably polyhedral-convex—so that the spacing between two key-contact surface regions opposing each other over a pushing-on axis can be less at their end far from the vertex than at their end near the vertex. Thus these key-contact surface regions can form a pushing-on aid for a key and reduce or even avoid the "threading" often required in the prior art during pushing-on of a closely toleranced key onto key-contact-surface-region formations.

The "pushing-on axis" here is any theoretical movement path along which a spanner formation of a key is pushed onto the key-contact-surface formations of the cutting tool to prepare a torque introduction. It extends orthogonal to the tool axis of the cutting tool onto which the spanner formation is pushed-on. It lies in the plane of extension of the normally flat spanner formation. The pushing-on axis and the above-mentioned insertion axis correspond to each other and are simply based on a different coordinate origin: the pushing-on axis on the cutting tool and the insertion axis on the spanner formation.

In addition, using the at least one inventive key-contact-surface formation including key-contact surface regions angled away from each other, it can also be ensured that an abutting engagement between a key surface of a key and a key-contact surface region of the cutting tool is effected as a surface abutment, and torque is not introduced, for example, via an edge of the at least one key-contact-surface formation. With the key-contact-surface formations of the prior art, which only include two key-contact surface regions opposing each other and parallel to the tool axis, a torque introduction via the edges of the key-contact-surface formations—here this means the edges ending the key-contact-surface formations in the circumferential direction—is rather the norm, because the spanner formation of the key must be provided with a certain oversize, compared to the spacing of the key-contact surfaces, if a pushing-on of the spanner formation onto the key-contact-surface formations is to be at all possible. If the spanner formation is then rotated about the tool axis after the pushing-on of the key-contact-surface formations of the prior art, this normally results in an abutment of the jaws of the spanner formation exclusively on the edges of the key-contact-surface formations.

The situation is different with the inventive cutting tool, where the described inclination from orthogonal over the pushing-on axis forms a type of insertion or pushing-on slant of mutually opposing key-contact surface regions that facilitates the pushing-on of a key. The spanner width of a spanner formation required for a screwing-in or unscrewing of a prespecified cutting tool can thereby be provided with smaller tolerances than is the case in the prior art, which leads to an advantageous surface abutment of key surfaces on the key-contact surface regions. This in turn leads to a significantly reduced Hertz Pressure on the component sections participating in the torque introduction, so that with otherwise identical component design as in the prior art, and an increased torque can be introduced in an inventive cutting tool.

The tool axis/axis of rotation of the cutting tool defines an axial direction here. If no deviating definition is provided in the present application, "radial" indicates a direction orthogonal to the tool axis towards said axis or away from it, and "circumferential direction" indicates a direction encircling the tool axis. The tool axis thus forms the origin of a cylindrical coordinate system.

In order to avoid an undesired axial force being exerted on the cutting tool when there is introduction of torque into the key-contact surface regions, it is advantageous if a tilt axis, about which two adjacent key-contact surface regions of a key-contact-surface formation are inclined relative to each other about the tool axis, is parallel to the tool axis.

In principle it is conceivable to configure a key-contact surface region that is curved in the axial direction, although this is not preferred if the key-surface regions of the key interacting with the cutting tool are flat. In this case the use of key-contact surface regions crowned or curved in the axial direction would significantly reduce the possible contact surfaces between key and cutting tool for a torque introduction and subsequently undesirably increase a Hertz pressure occurring with a torque introduction. For this reason, in order to provide a largest-possible contact surface, it is preferred if at least one key-contact surface region of a key-contact-surface formation is flat. For reasons of symmetry, preferably all key-contact regions of one key-contact-surface formation, preferably of both key-contact-surface formations, are flat, so that the tool engagement of a key with the rotatable cutting tool is the same for all possible relative rotational positions between cutting tool and key.

In the case of the preferred flat formation of the key-contact surface regions, an undesirably arising axial force during the torque introduction can be avoided in that at least one flat key-contact surface region, preferably all flat key-contact surface regions are disposed parallel to the tool axis.

In order to remove as little material as possible in forming the key-contact-surface formations on the cutting tool, and thus weakening the structure of the cutting tool as little as possible, it is preferred if the key-contact surface regions of a key-contact-surface formation directly adjacent in the circumferential direction are only slightly inclined relative to each other; for example, if their normal vectors enclose an angle of not more than 15°. In fact it has been shown in experiments that an angle of inclination that is already small both facilitates a pushing-on of a spanner formation onto the key-contact-surface formation of the cutting tool and makes possible a flattest-possible abutment of a key-surface region on a key-contact surface region during torque introduction, so that the angle enclosed between normal vectors of key-contact surface regions directly adjacent in the circumferential direction need be no more than 10°, preferably no more than 7.5°, and particularly preferably no more than 5° in order to achieve, on the one hand, the desired technical effect of a facilitation of threading and a flattest possible force introduction between key-surface regions and key-contact surface regions abutting thereon. Preferably all inclination angles on key-contact-surface formations of a cutting tool are the same size.

In order to achieve that the pushing-on of the key onto the key-contact-surface formations of the cutting tool depends as little as possible on the orientation of the cutting tool, it is provided according to a preferred further development of the present invention that the cutting tool includes two key-contact-surface formations, which are mirror-symmetric with respect to the plane of symmetry containing the tool axis and/or which are rotationally symmetric with respect to the tool axis as the axis of symmetry. In the case of mirror symmetry referred to, the above-mentioned pushing-on axis lies in the mirror-symmetry plane. The pushing-on axis and the tool axis, which is as a rule orthogonal thereto, then span the mirror-symmetry plane.

Both the abovementioned mirror symmetry and the abovementioned rotational symmetry furthermore allow the key-contact surface regions of a key-contact-surface formation to be configured with different lengths in the circumferential direction, if this is desired. Thus in the case of mirror symmetry the vertices of the key-contact-surface formations can oppose each other orthogonal to the pushing-on axis; in the case of rotational symmetry, the vertices can lie on a diameter line intersecting the tool axis, which can enclose an angle with the pushing-on axis that is different from 90°.

In order to introduce a torque as uniformly as possible into the cutting tool via at least two key-contact surface regions, it is advantageously provided that at least one key-contact surface region of a key-contact-surface formation is parallel to a key-contact surface region of another key-contact-surface formation. If torque introduction is not supposed to depend on the orientation of the cutting tool in the circumferential direction, for example if it should be possible to push a key onto the key-contact-surface formation from opposing sides, it is advantageous if each key-contact surface region of a key-contact-surface formation is parallel to a key-contact surface region of the other key-contact-surface formation. Here it is more precisely advantageously provided that mutually parallel key-contact surface region of different key-contact-surface formations are located in diametrically opposing circumferential regions of the cutting tool so that a torque can be introduced into the cutting tool as uniformly as possible via at least two essentially diametrically opposing key-contact surface regions. The distance of two parallel key-contact surface regions to each other then determines the spanner- or key-width required for an introduction of torque into these key-contact surface regions. It also applies here that due to the mutually inclined arrangement of the key-contact surface regions of the key-contact-surface formations, a spanner formation having the required spanner- or key-width can be provided with smaller dimensional tolerances compared to the prior art and can nonetheless be easily pushed-onto the key-contact-surface formations including the inclined key-contact surface regions without an undesirable threading effort being required for this, despite the narrower dimensional tolerances. The result of the narrower tolerances is in turn an advantageously flat abutment of key-surface regions and key-contact surface regions against each other during the introduction of torque, with the effects already described above.

In principle it is conceivable to provide a plurality of key-contact-surface formations on the cutting tool. In fact, however, exactly two opposing key-contact-surface formations are sufficient for torque introduction into the cutting tool. To minimize the manufacturing effort, a cutting tool therefore preferably includes exactly two key-contact-surface formations.

Preferably the circumferential region between the exactly two key-contact-surface formations is free of a key-contact surface and particularly preferably includes a partial cylindrical section there. Most cutting tools are manufactured as a base body from a cylinder; for example from hard metal and the like, so that to form the key-contact-surface formations, only the circumferential regions of the cylindrical base body that are to carry these key-contact-surface formations later need to be processed, while the cutting-tool regions lying between the key-contact-surface formations in the circumferential direction can maintain their original partial-cylindrical design. This reduces the manufacturing expense required for the production of the cutting tool.

A key-contact-surface formation can also in principle include any number of key-contact surface regions, of which every two key-contact surface regions directly adjacent in the circumferential direction are inclined relative to each other by an angle of inclination. Since the space available for forming a key-contact-surface formation on a cutting tool is limited, the individual key-contact surface regions of one and the same key-contact-surface formations are shorter in the circumferential direction with increasing number. In order to provide a sufficiently large surface for a contact of a key, it is therefore preferred if each key-contact-surface formation includes exactly two key-contact surface regions inclined relative to each other. The cutting tool thus formed including the key-contact-surface formations as described above can be operated using a conventional key for cutting tools, i.e., using a key including a spanner formation whose opposing jaws each include only one flat key surface, wherein the two key surfaces present are parallel to each other as well as orthogonal to a plane of extension of the spanner formation.

According to a second aspect of the present invention, the above-mentioned object is also achieved by a spanner formation of the above-mentioned type wherein the angle of inclination between the two key-surface regions of each jaw is less than or equal to 10°, preferably less than or equal to 7.5°, particularly preferably less than or equal to 5°.

Such a spanner formation can be used with conventional cutting tools including two flat, mutually opposing key-contact surface regions that are parallel both to each other and to the tool axis, or it can be used with an inventive cutting tool as described above.

Due to the advantageously small angle of inclination as mentioned above, on the one hand, an insertion of the key-contact-surface formations of a cutting tool into the spanner formation is facilitated. Furthermore a surface abutment of key-surface regions on key-contact surface regions on the cutting tool is supported so that an undesired line—or even point-load during torque introduction, in particular in a region near the edge on a circumferential edge of a key-contact surface region, can be avoided. Finally, due to the small angle of inclination, a dead movement with reversal of rotational direction between two abutment contacts of key-surface regions and key-contact surface regions is kept small.

The facilitation of the insertion of a cutting tool or of its key-contact-surface formations into the spanner formation can be even further promoted in that the distance between the two key-surface regions of the mutually opposing jaws near the spanner opening is made smaller in the direction of insertion, the key-surface regions near the spanner opening consequently forming a type of insertion chamfer in the insertion direction.

Additionally or alternatively, the distance between the two key-surface regions near the spanner opening can be made larger in the insertion direction so that only the two vertices of mutually opposing jaws form a constriction of the spanner formation, which is, however, short in the insertion direction.

The advantageous introduction of torque in key-contact-surface formations having two key-contact surface regions parallel to each other and to the tool axis over a surface contact of key-surface regions and associated key-contact surface regions can be further improved in that the key-surface region near the spanner opening of the one jaw is parallel to the key-surface region far from the spanner opening of the other opposing jaw. Thus, in addition, with flat abutment of the key-surface regions on associated key-contact surface regions, a largest-possible load arm can be used for the torque introduction. The load arm should be seen in connection with the tool axis, about which the cutting tool should be rotated due to the torque introduction.

Although it should not be excluded that a key-surface region or a part of the key-surface region can be formed as crowned in order to achieve a largest-possible contact surface of the key-surface regions with the associated key-contact surface regions during introduction of torque, it is advantageous if at least a part of the key-surface region is flat, provided that the associated key-contact surface regions for abutting engagement are also flat. To avoid an occurrence of undesired axial forces during the introduction of torque, the flat key-surface regions are preferably orthogonal to a plane of extension of the spanner formation wherein the insertion axis also lies. With ideal abutting engagement of the spanner formation on the above-described cutting tool, the plane of extension of the spanner formation is oriented orthogonal to the tool axis.

In order to achieve a rapid and simple insertion of the cutting tool or its key-contact-surface formations into the spanner formation, an insertion chamfer tapered in the insertion direction can be provided in the insertion direction between the spanner opening and the two opposing key-surface regions near the spanner opening. Thus the spanner formation can initially provide a coarse insertion chamfer, which leads to the key-surface regions near the spanner opening. This insertion taper can have an opening angle of more than 40° or more than 50°. An opening angle of 60° has proven itself in practice. The flanks of the insertion chamfer do not form key-surface regions, since with the introduction of torque after production of a proper abutting engagement of the spanner formation with a cutting tool, no component outer surface of the cutting tool reaches force-transmitting abutment on a flank of the insertion chamfer or is located in such abutment.

Therefore, only that surface region of the spanner formation is to be seen as a key-surface region that is actually configured for an abutting engagement on a key-contact surface region of the cutting tool for the purpose of torque transmission. The corresponding applies mutatis mutandis for a key-contact surface region of the cutting tool.

Here the insertion chamfer can have a considerable length along the insertion axis in order to accurately lead the key-contact-surface formations of the cutting tool during an insertion process to the only slightly inclined key-contact surface regions of the spanner formation which therefore form a significantly smaller opening angle. For this purpose it can be provided that the spanner region delimited by the insertion chamfer on both sides of the insertion axis has a length measured along the insertion axis that is greater than the length along the insertion axis of the spanner region delimited y the key-surface regions near the spanner opening and/or of the spanner region delimited by the key-surface regions far from the spanner opening.

At the spanner opening on the end of the spanner formation opposing the insertion direction, the jaws are preferably connected to each other by a spanner base. The jaws are preferably configured in one piece with the base.

The spanner formation can be provided on a key and can in particular be permanently connected to the key. In this case a specific key is to be provided for every possible spanner width. For uniform and high-precision torque introduction, such a key preferably has handles for an operator on both sides of the spanner formation. The present invention thus also relates to a key having a spanner formation as described above.

However, in many cases it is sufficient to simply provide a key frame wherein application components including spanner formations of different spanner widths are usable interchangeably. The present invention therefore also relates to an application component for a key frame including a spanner formation as described above.

The spanner formation is preferably formed on a component made from hard metal or tool steel.

In the case of a set of rotatable cutting tools having different key widths, for example, because the individual cutting tools have different diameters, the angle of inclination between two key-contact surface regions directly adjacent in the circumferential direction is preferably the same size for all key widths. The same applies in a corresponding manner for a set of different application components including spanner formations of different key widths. Here also the inclination angles at which directly adjacent key-surface regions incline away from each other are preferably the same size for all key widths.

In the sense of the present invention, a tool inserted in a chuck and secured there using a cap nut can also be seen as a cutting tool. This cutting tool need not provide a screw-connection formation on its longitudinal end region. The key-contact-surface formation configured as described above is then formed on the cap nut. The present invention thus also relates to a cap nut for a tool chuck including key-contact-surface formations, which are equipped as provided in the present application. In this respect, for detailed further development of this cap nut as well, see the text above, where the term "cutting tool" should be seen as replaced by the term "chuck cap nut."

BRIEF DESCRIPTION OF THE DRAWING FIGURES

The present invention is described in more detail below based on the accompanying drawings.

DETAILED DESCRIPTION OF THE PREFERRED EMBODIMENTS

Figure 1:
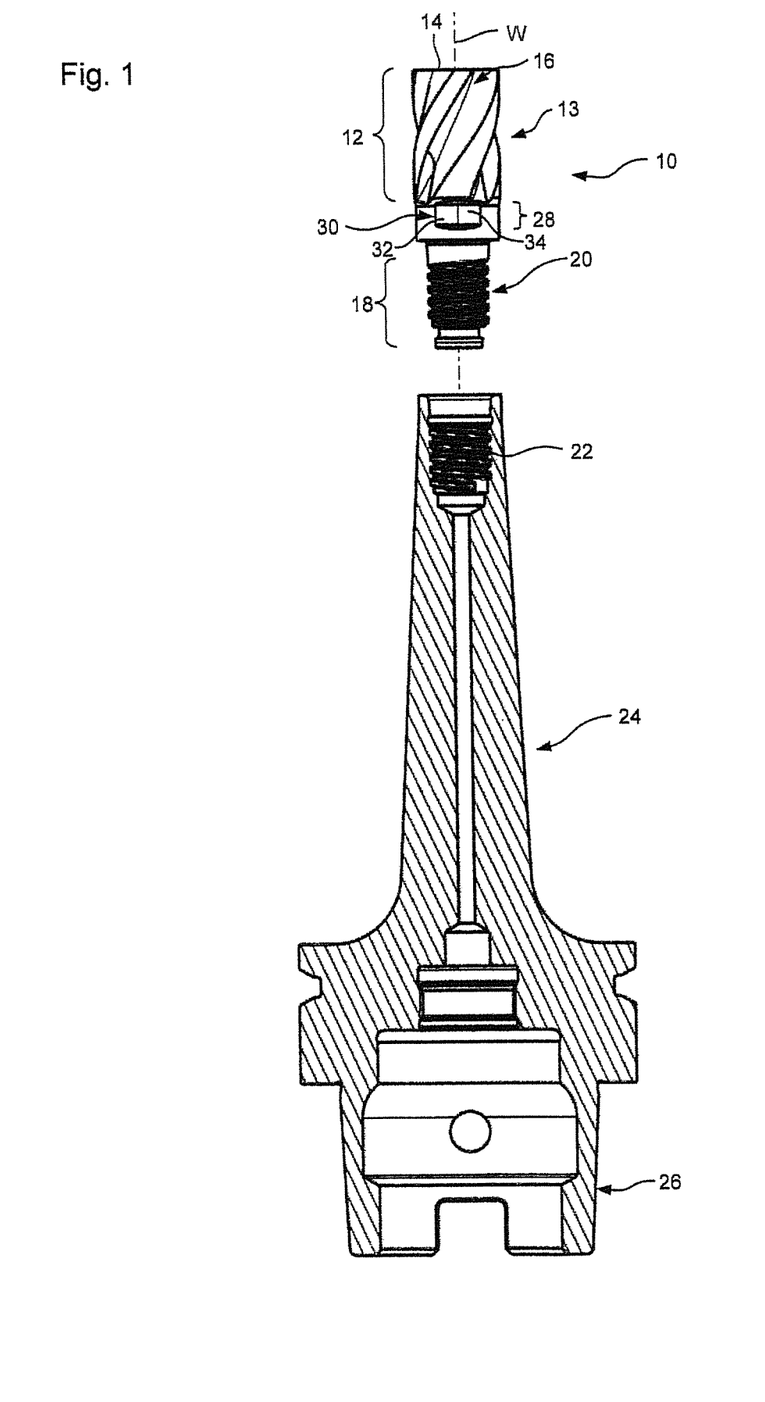
FIG. 1 depicts a longitudinal section through a tool receptacle for a machine spindle of a machine tool including a first embodiment of an inventive cutting tool of the present application having an acute vertex in the key-contact surface formations.

In FIG. 1 a first embodiment of an inventive cutting tool in the exemplary form of a milling head is generally designated by 10. The milling tool 10 extends along a tool axis W about which the tool head 10 rotates during its workpiece machining in normal operation. In its axial longitudinal region 12 the workpiece head 10 is provided with a cutting formation 13, in the present case including a plurality of cuts 14 and chip-removal grooves 16 extending helically about the tool axis W.

At its opposing other longitudinal end region 18 the tool head 10 is provided with a screw-connection formation, i.e., with a thread 20, which is screwable into the internal thread 22 of a tool receptacle 24. The thread 20 does not need to reach the outermost longitudinal end of the tool head 10.

At its longitudinal end opposing the internal thread 22 the tool receptacle 24 includes a coupling formation 26 for coupling with a not-depicted machine spindle of a machine tool, in the present example, a coupling formation 26 in the design of a hollow shank taper, for example according to DIN 69893. Instead of the tool receptacle 24 the tool head can also be screwed into a—preferably cylindrical—shaft component or into a tool receptacle including a steep-taper coupling formation.

Tool receptacles like the tool receptacle 24 in FIG. 1 are generally known and will not be further explained here.

In an axial section 28, which is located between the longitudinal end regions 12 and 18, which, however, can overlap with longitudinal end region 12 carrying the cutting formation 13, the tool head 10 includes a key-contact-surface formation 30, which includes two key-contact surface regions 32 and 34 directly adjacent in the circumferential direction about the tool axis W.

These key-contact-surface formations 30 or the key-contact surface regions 32 and 34 belonging to them provide, among other things, an abutting engagement that is as flat as possible by the key-surface regions of a key in order to screw the tool head 10 into the internal thread 22 of the tool receptacle 24 and unscrew it again therefrom.

Figure 2A:
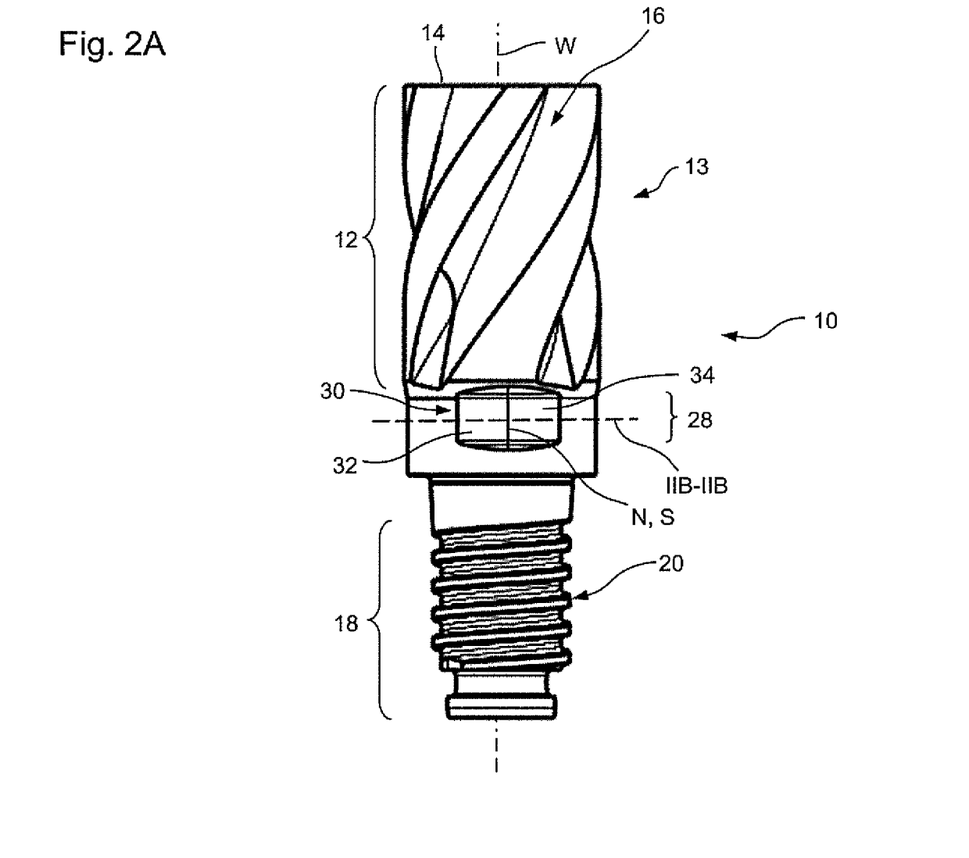
FIG. 2a depicts a side view of the inventive cutting tool of FIG. 1 according to the first embodiment.

The tool head 10 of FIG. 1 is depicted in FIG. 2a in the same view but larger. A line N at the transition between the key-contact surface regions 32 and 34 indicates a preferred inclination axis parallel to tool axis W, about which the key-contact surface regions 32 and 34 are inclined away from each other so that they form in a vertex S that projects away from the tool axis W.

Figure 2B:
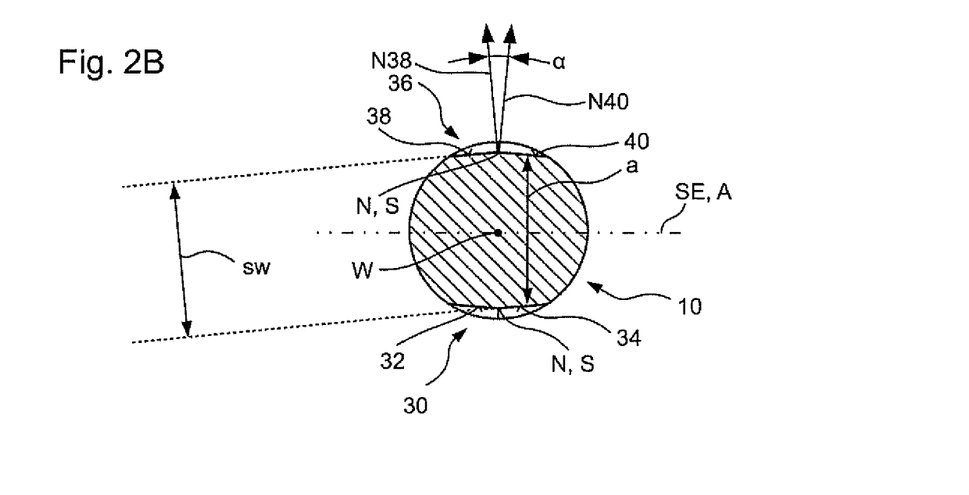
FIG. 2b depicts a cross-sectional view in the sectional plane IIb-IIb of FIG. 2a through the axial section of the cutting tool from FIG. 2a, which axial section carries the key-contact surface formations.

On the side facing away from the viewer of FIG. 2a, a further key-contact-surface formation 36 is formed, which is configured mirror-symmetrically to the key-contact-surface formation 30 with respect to a mirror-symmetry plane SE parallel to the drawing plane of FIG. 2a (see also FIG. 2b). This second key-contact-surface formation 36 accordingly includes the key-contact surface regions 38 and 40, which are also inclined away from each other about an inclination axis N parallel to the tool axis W and in fact by the same angle α of approximately 5° by which the key-contact surface regions 32 and 34 are also inclined away from each other. Thus the key-contact surface regions 38 and 40 also from a vertex S projecting from the tool axis W.

The sectional plane IIb-IIb of FIG. 2a, which determines the view of FIG. 2, is orthogonal to the tool axis W. Thus the tool axis W and the inclination axis N are orthogonal to the drawing plane of FIG. 2b.

In FIG. 2b, the normal vector N38 of the key-contact surface region 38 and the normal vector N40 of the key-contact surface region 40 are depicted with their base points shifted into the same location. The two normal vectors N38 and N40 enclose the angle of inclination a of the key-contact surface regions 38 and 40. For reasons of clarity of the depiction of FIG. 2b, the normal vectors are only shown at the key-contact surface regions 38 and 40; the same correspondingly applies for the remaining key-contact surface regions 32 and 34.

Since in the exemplary embodiment the key-contact surface regions 32, 34, 38, and 40 of the cutting tool 10 are the same length in the circumferential direction about the tool axis, the key-contact-surface formations 30 and 36 are also rotationally symmetric to each other with respect to the tool axis W as axis of rotational symmetry. The key-contact surface formations 30 and 36 are thus transformable into each other by rotation by 180° about the tool axis W.

Orthogonal to the tool axis W in the symmetry plane SE lies the pushing-on axis A, along which a key: more precisely, a spanner formation of the key, onto which the key-contact-surface formations 30 and 36 can be pushed in order to produce a standby position for the torque introduction into the key-contact surface regions 32 and 40 on one side or 34 and 38 on the other side, depending on the direction of rotation.

The key-contact surface regions, 32 and 40 on one side and 34 and 38 on the other side, lying in diametrically opposing circumferential regions, are preferably parallel to each other. In the first embodiment shown in FIGS. 1 to 2b the key-contact surface regions 32, 34, 38 and 40 are respectively oriented flat and parallel to the tool axis W.

The circumferential regions between the key-contact-surface formations 30 and 36 have the original partial cylindrical design of the cylinder blank from which the exemplarily depicted cutting tool 10 has been produced.

As can be easily seen in FIG. 2b, the key-contact surface regions 34 and 40 on one hand and 32 and 38 on the other hand, which lie opposite each other over the pushing-on axis A, form, due to their inclined arrangement relative to the tool axis W, a pushing-on aid for a spanner formation to be pushed onto the key-contact-surface formations 30 and 36 along the pushing-on axis A. Due to the arrangement of the key-contact surface regions inclined with respect to one another, a distance a between key-contact surface regions 34 and 40 or 32 and 48 opposing each other over the pushing-on axis A is smaller with increasing distance from the tool axis W so that the mentioned key-contact surface-region pairs 34 and 40 as well as 32 and 38 respectively form a type of pushing-on or insertion taper for a spanner formation that is to be pushed on.

The key width sw suitable for a torque introduction into the cutting tool 10 results from the distance of the planes of extension of mutually parallel key-contact surface regions 32 and 40 on the one hand and 34 and 38 on the other hand. In FIG. 2b the key width sw for the key-contact surface region pair 34 and 38 is indicated by a dashed line. Since the key width sw is substantially greater than the distance a, measured at the location of the respective key-contact surface region pair farthest away from the tool axis W, on the one hand the spanner formation can be produced and provided with very small dimensional tolerance and nevertheless be pushed onto the key-contact-surface formations 30 and 36 without time-consuming threading. The key width sw is preferably the same size for both key-contact surface region pairs.

Due to the precisely fitting spanner formation provided with only small dimensional tolerances, a flat abutment of key-surface regions of the spanner formation introducing a torque into the tool head 10 can abut flatly on the key-contact surface regions 32 and 40 on the one hand or 34 and 38 on the other hand, so that, due to the high contact surface, a high torque can also be introduced into the tool head without fear of damage to the key-contact surface formations 30 and 36.

For the introduction of torque into the key-contact surface formations 30 and 36, a conventional spanner formation including only two mutually opposing and parallel key surfaces can be used.

Figure 3:
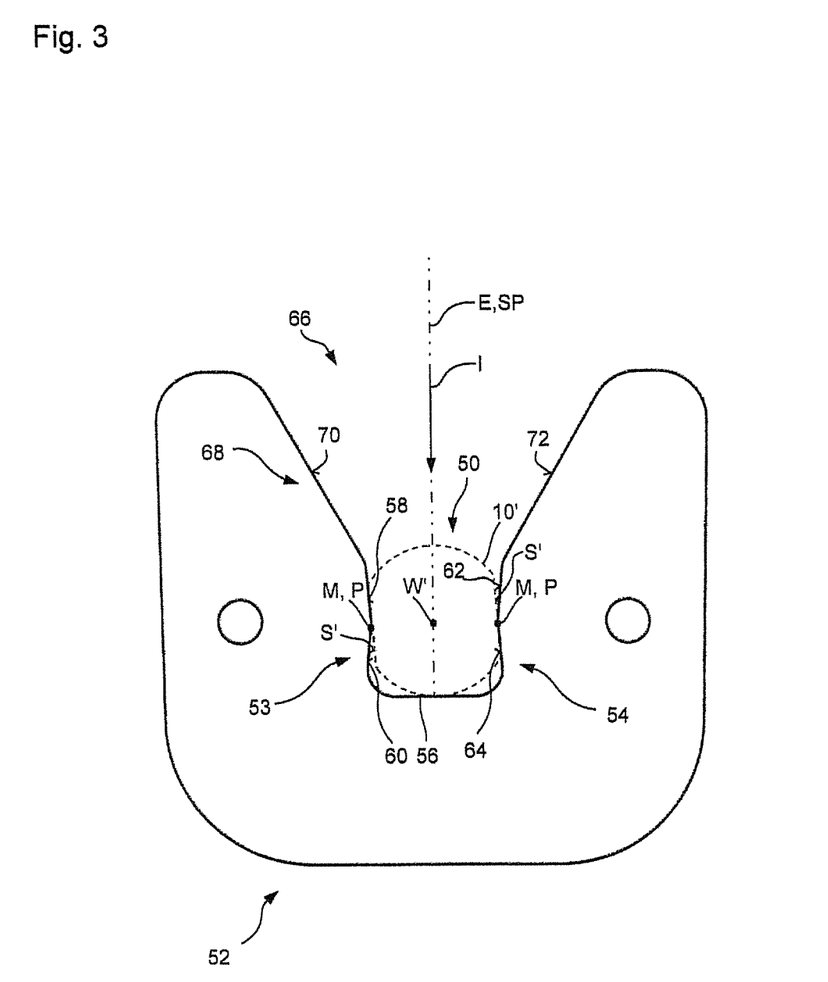
FIG. 3 depicts a plan view of a first embodiment of a spanner formation, realized on an application component for releasable receiving in a key frame.

If the advantageous technical effect of the above-described design of the torque-introduction point is also going to be usable even when a conventional tool head including key-contact surface formations respectively having only exactly one tool axis and mutually parallel key-contact surfaces is available, this can happen using a spanner formation 50, as depicted in FIG. 3. The spanner formation 50 of FIG. 3 is formed on a known application component 52 for releasable receiving in a not-shown key frame. The application component 52 is a substantially flat component, i.e., it extends in the main extension direction of its plane of extension in substantially larger dimensions than in its thickness direction orthogonal thereto. In FIG. 3 the plane of extension of the application component 52 is parallel to the drawing plane of FIG. 3. The plane of extension of the application component 52 is also the plane of extension of the spanner formation, which is also a flat structure.

In FIG. 3 the outline of an axial section of a conventional tool head 10' is shown with a dashed line, which conventional tool head 10' includes exactly two key-contact surface formations each having only one key surface S', which are parallel both to each other and to the tool axis, and are flat. The tool axis W' of the conventional tool head in FIG. 3 is also indicated.

The spanner formation 50 includes two mutually opposing jaws 53 and 54, which are connected to each other by a base 56 delimiting the spanner formation.

A tool head 10' is insertable into the spanner formation 50 along the insertion axis E in the insertion direction I, preferably until an outer-surface region of the tool head 10 abuts on the base 56 of the spanner formation 50.

The insertion axis E lies in the plane of extension of the spanner formation 50 or parallel thereto. The insertion axis E is thus oriented parallel to the drawing plane of FIG. 3. The jaws 53 and 54 lie across from each other over the insertion axis E. Here the jaw 53 include exactly two key-surface regions 58 and 60, which follow each other directly along the insertion axis E and which are inclined away from each other about an inclination axis M. The angle of inclination in the example depicted corresponds to approximately 5°. The angle of inclination is preferably the same as that between the key-contact surface regions 32, 34 and 38, 40.

The jaws 53 and 54 are in turn configured mirror-symmetrically with respect to a symmetry plane SP orthogonal to the drawing plane of FIG. 3 and containing the insertion axis E, so that the key-surface regions 62 and 64 of the jaw 54 are sufficiently clarified by specifying the symmetry conditions with the description of the key-surface regions 58 and 60 of the jaws 53, and require no further explanation. All key-surface regions 58, 60, 62 and 64 in the example shown in FIG. 3 are flat and oriented orthogonal to the plane of extension of the application component 52 or the spanner formation 50.

The key-surface regions 58 and 62 of a jaw 53 or 54 nearest the spanner opening are parallel to the key-surface regions 60 and 64 of the respective other jaws 54 or 53 farthest from the spanner opening in order to introduce torque in a tool head in a flattest-possible abutment on key-contact-surface formations S'. In the example depicted, the mutually parallel key-surface regions 58 and 64 are in flat abutting engagement with the key-contact surface formations of the conventional tool head 10' and ready for torque transmission in the clockwise direction about the tool axis W'.

To facilitate insertion of the tool head 10' and its key-contact-surface formations into the spanner formation 50, starting from the spanner opening 66 an insertion chamfer 68 can be formed which leads, starting from the spanner opening 66, to the key-surface regions 58 and 62 closest to the spanner opening.

The insertion chamfer 68 is preferably also configured symmetric to the above-described symmetry plane SP and is defined by two flanks 70 and 72 that enclose an angle of greater than 40°, in the example shown of approximately 60°, and starting from the spanner opening 66 extend towards each other in the direction of the spanner formation 50.

The key-surface regions 58 and 60, like the key-surface regions 62 and 64, also form vertex P projecting towards the respective other jaw. The spacing of key-surface regions 58 and 62 near the spanner opening directly opposing each other over the insertion axis decreases with increasing approximation in insertion direction I to the vertex P, so that the key-surface regions 58 and 62 closest to the spanner opening offer an insertion aid for the inserting of a tool head 10' into the spanner formation 50.

The key-surface regions 60 and 64 farthest from the spanner opening are inclined such that their distance measured over the insertion axis E becomes larger with increasing distance from the vertices P, so that only the vertices P of the two jaws 52 and 54 form a constriction of the spanner formation 50, which is easy to overcome for a tool head since the distance of the vertices P to each other is still significantly greater than the key width SW.

As FIG. 3 shows, the length of the insertion chamfer 68 along the insertion axis E is longer than the length of the region of the spanner formation 50 delimited by the key-surface regions 58, 60, 62, and 64, also measured along the insertion axis E.

Figure 4A:
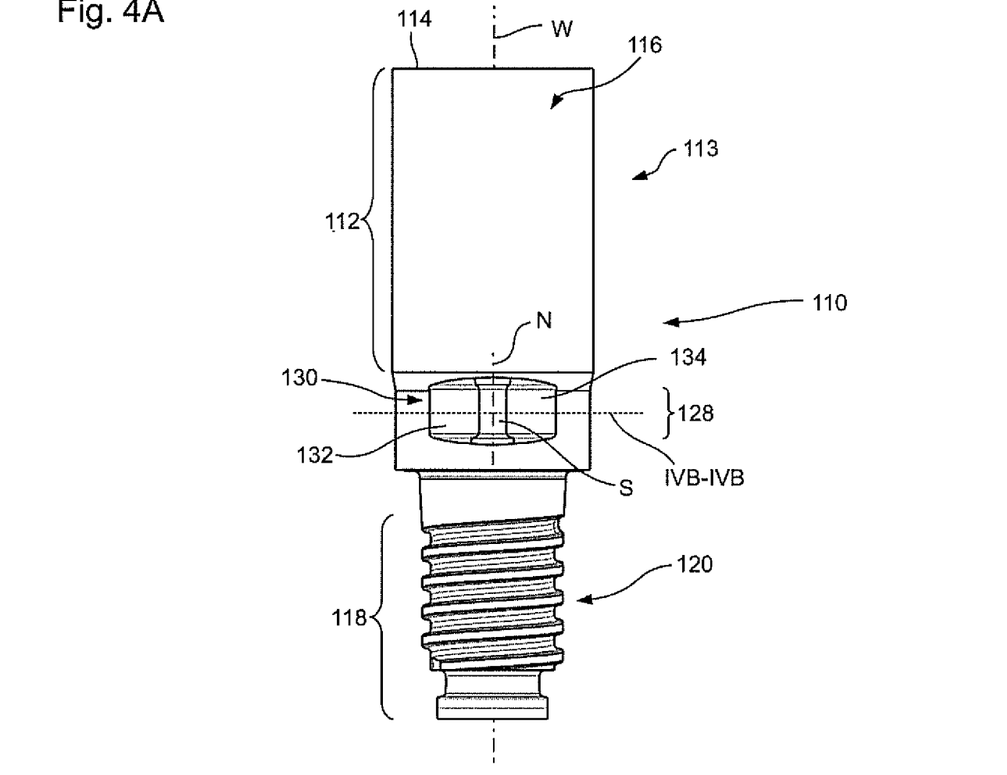
FIG. 4a depicts a side view of the inventive cutting tool of FIG. 1 according to a second embodiment with flattened vertex.
Figure 4B:
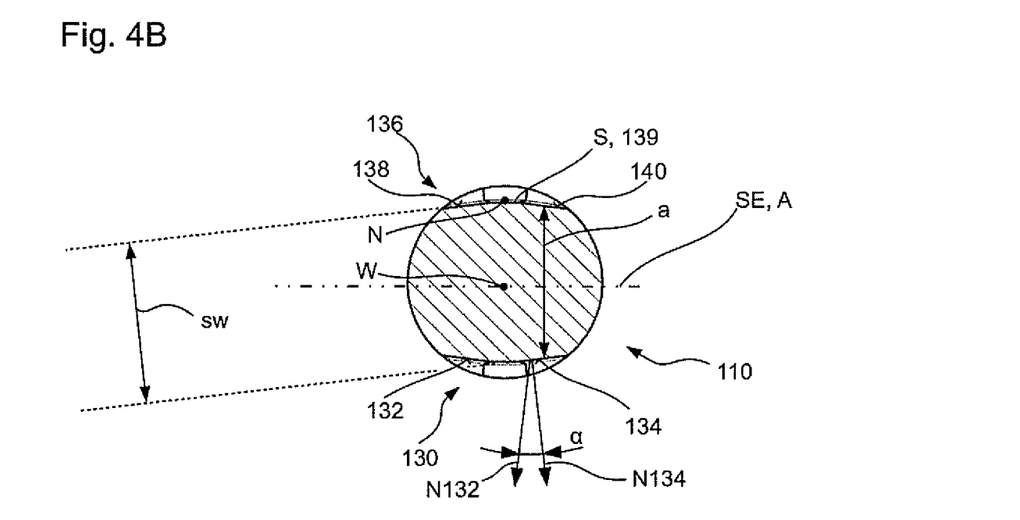
FIG. 4b depicts a cross-sectional view in the sectional plane IVb-IVb of FIG. 4a through the axial section of the cutting tool from FIG. 4a, which axial section carries the key-contact surface formations.

In FIGS. 4a and 4b the views of FIGS. 2a and 2b are depicted corresponding to a second embodiment of an inventive tool head. Identical and structurally identical components or component sections such as in the first embodiment of FIG. 2a or 2b are provided in FIGS. 4a and 4b with identical reference numbers, but increased by the number 100. The second embodiment depicted in FIGS. 4a and 4b is described below only to the extent that it differs from the first embodiment, to the description of which the first embodiment reference is otherwise also explicitly made in the second embodiment.

The cutting formation 113 is only schematically indicated in FIG. 4a. This can have the same or a different design as the cutting formation 13 of the first embodiment.

The essential difference between the embodiments of FIGS. 2a and 2b on the one hand and FIGS. 4a and 4b on the other hand is in the design of the key-contact surface formations 130 and 136. In contrast to the first embodiment, where there is an acute vertex S between directly adjacent key-contact surface regions in the circumferential direction, in the second embodiment, the vertex S formed between the key-contact surface regions 132 and 134 of the key-contact-surface formation 130 and between the key-contact surface regions 138 and 140 is flattened, i.e., the respective vertex S is formed by an intermediate surface region 139 located between the key-contact surface regions in the circumferential direction of the same key-contact-surface formation.

The intermediate surface region 139, which for reasons of better clarity in FIG. 4b is only provided with a reference number in the key-contact surface formation 136, can be curved convex or even concave about an axis of curvature parallel to the tool axis W, but for reasons of simple manufacturing is preferably flat. Due to the flattening, the distance a between the vertices S of the second embodiment is less than the distance a of the vertices S of the first embodiment. This significantly facilitates the inserting of the key-contact surface formations 130 and 136 into a matching spanner formation, or the pushing of a matching spanner formation onto the mentioned key-contact surface formation.

In contrast to the vertices S, which due to the formation of the intermediate surface region 139 are no longer configured as linear only, but rather as flat, the inclination axis N remains essentially unchanged. The inclination axis N orthogonal to the drawing plane of FIG. 2b is depicted in FIG. 2b for the key-contact surface formation 136.

At the key-contact surface formation 130, the normal vectors N132 and N134 of the key-contact surface regions 132 and 134 and the angle α enclosed by them are depicted. The normal vector 134 is shown at its key-contact surface region 134. The normal vector N132 of the key-contact surface region 132 is shifted by its base point into the base point of the normal vector N134 in order to illustrate the enclosed angle α.

It also applies for the key-contact surface formations 130 and 136 of the second embodiment that the key width sw is not smaller than the distance of the vertices S to each other, which facilitates a pushing-on of a matching spanner formation onto the key-contact surface formations 130 and 136. As before, the key width sw is also significantly greater than the distance a between the key-contact surface regions 134 and 140 opposite to each other over the pushing-on axis A on the one hand and 132 and 138 on the other hand at their farthest location with respect to the tool axis W.

The invention claimed is:

1. Rotatable cutting tool, which extends along a tool axis defining an axial direction, the rotatable cutting tool comprising:
    a cutting formation in a first axial longitudinal end region, which is configured for material ablation on a workpiece, wherein the cutting tool includes a screw-connection formation in a second axial longitudinal end region opposing the first, which is configured for screw connection with a coupling unit; and
    exactly two key-contact surface formations diametrically opposing each other with respect to the tool axis, which are configured for torque-transmitting abutting engagement with key surfaces of a torque key,
    wherein each of the exactly two key-contact surface formations includes exactly two key-contact surfaces provided in the circumferential direction about the tool axis, wherein the exactly two key-contact surfaces are directly adjacent to each other in the circumferential direction and inclined away from each other such that they form a vertex projecting in the radial direction away from the tool axis;
    wherein normal vectors to the exactly two key-contact surfaces of a respective key-contact surface formation of said exactly two key-contact surface formations enclose an angle that is less than or equal to 15°,
    wherein a circumferential region between said exactly two key-contact surface formations is non-faceted and free of a key-contact surface.

2. The rotatable cutting tool according to claim 1, wherein an inclination axis by which the exactly two key-contact surfaces of each key-contact surface formation of said exactly two key-contact surface formations are inclined relative to each other, is parallel to the tool axis.

3. The rotatable cutting tool according to claim 1, wherein at least one key-contact surface of the exactly two key-contact surfaces of each of the exactly two key-contact surface formations is or are flat.

4. The rotatable cutting tool according to claim 3, wherein at least one of the flat key-contact surfaces is or are oriented parallel to the tool axis.

5. The rotating cutting tool according to claim 1, wherein the exactly two key-contact surface formations are mirror-symmetric with respect to a symmetry plane containing the tool axis and/or are rotationally symmetric with respect to the tool axis as axis of symmetry.

6. The rotatable cutting tool according to claim 1, wherein the exactly two key-contact surfaces of each of the exactly two key-contact surface formations comprise a first key-contact surface and a second key-contact surface, wherein the first key-contact surfaces are parallel to each other and the second key-contact surfaces are parallel to each other.

7. The rotatable cutting tool according to claim 6, wherein the first key-contact surfaces are mutually diametrically opposed with respect to each other; and wherein the second key-contact surfaces are mutually diametrically opposed with respect to each other.

8. The rotatable cutting tool according to claim 1, wherein the rotatable cutting tool is a milling-, grinding-, or drill-head.

9. The rotatable cutting tool according to claim 1, wherein the coupling unit comprises a shaft component, tool receptacle, and/or chuck.

10. The rotatable cutting tool according to claim 1, wherein all key-contact surfaces are flat.

11. The rotatable cutting tool according to claim 3, wherein all of the flat key-contact surfaces are oriented parallel to the tool axis.

12. The rotatable cutting tool according to claim 1, wherein the angle enclosed by the normal vectors of the exactly two key-contact surfaces of each of the exactly two key-contact surface formations is less than or equal to 10°.

13. The rotatable cutting tool according to claim 1, wherein the angle enclosed by the normal vectors of the exactly two key-contact surfaces of each of the exactly two key-contact surface formations is less than or equal to 7.5°.

14. The rotatable cutting tool according to claim 1, wherein the angle enclosed by the normal vectors of the exactly two key-contact surfaces of each of the exactly two key-contact surface formations is less than or equal to 5°.

15. Rotatable cutting tool according to claim 1, wherein said circumferential region between said exactly two key-contact surface formations has a partial-cylindrical design.

16. Rotatable cutting tool according to claim 1, wherein the vertex is located at a pointed edge.

17. Rotatable cutting tool according to claim 1, wherein the vertex is located on a flat surface or a curved surface.

* * * * *